United States Patent Office 3,509,232
Patented Apr. 28, 1970

3,509,232
MODIFIED THERMOPLASTIC POLYURETHANE
Charles S. Schollenberger, Hudson, Ohio, assignor to The
B. F. Goodrich Company, New York, N.Y., a corporation of New York
No Drawing. Filed Aug. 24, 1966, Ser. No. 574,564
Int. Cl. C08g 22/00, 22/04, 41/04
U.S. Cl. 260—858                              1 Claim

ABSTRACT OF THE DISCLOSURE

Essentially linear high molecular weight polyesterurethanes, which are soluble in polar organic solvents such as dimethyl formamide, become insoluble in dimethyl formamide and exhibit substantially lower compression set when blended with low molecular weight isocyanate-terminated polyurethane prepolymer.

This invention relates to simulated vulcanizates of polyurethane elastomers. More particularly it relates to the provision of new compositions comprising essentially linear polyurethanes admixed with low molecular weight, isocyanate-terminated polyurethane prepolymers.

Essentially linear polyurethane polymers are known materials. Polyetherurethanes of this type are described in United States Patent 2,899,411. Polyesterurethanes of this type are described in United States Patent 2,871,218. These essentially linear polyurethanes have tensile strengths of 6000 plus p.s.i., good Taber abrasion resistance and good resistance to hydrocarbons, air diffusion and aging. The object of this invention is to provide materials of this nature with even better properties, thereby to increase the scope of their usefulness.

It has been discovered that if an essentially linear polyesterurethane or polyetherurethane is admixed with from 1% to 150% by weight of an isocyanate-terminated polyurethane prepolymer of low molecular weight (about 700 to about 10,000), extremely useful materials are produced. These new compositions process in a manner similar to that of thermoplastic polyurethanes, but exhibit superior ultimate properties. They have better resistance to polar organic solvents and to heat. They also exhibit reduced permanent set.

In the practice of the invention, the isocyanate-terminated polyurethane prepolymer is mixed with the polyurethane by mill blending, Banbury mixing, solvent mixing (in solvents inert to isocyanate groups) or other convenient means. The product composition is fabricated into a finished shape such as a fiber, film, or a cast or molded form and the reactive prepolymer chains interact with themselves and in small measure with the linear polyurethane chains, thereby providing crosslinked materials with greater stability and higher levels of various properties than are obtained when the linear polyurethanes are fabricated to fiber, film or molded shapes without the addition and admixture of the low molecular weight, isocyanate reactive polyurethane prepolymer.

The isocyanate-terminated polyurethane prepolymers employed as the additive component in this invention are prepared by reacting from 1.1 to 2.0 mols of an organic diisocyanate, prefereably a diphenyl diisocyanate with an isocyanate group on each phenyl nucleus, with 1.0 mol of a hydroxyl-terminated, essentially linear polyester, polyether or polythioether of molecular weight about 400 to about 5000. Mixtures of these polyurethane prepolymers in a variety of combinations may be employed with mixtures of polyesterurethanes, polyetherurethanes, polyesteretherurethanes and polyesteramideurethanes to obtain variations of ultimate properties.

The preparation of the linear polyurethane polymers is described in the above-mentioned patents. Polyesterurethanes and polyetherurethanes of this type are available on the market.

The polyesterurethanes are made according to the teaching of United States Patent 2,871,218 by admixing and heating one mol of a linear hydroxyl-terminated polyester having an average molecular weight between about 600 and about 2000 and having an acid number less than 10, from 1.1 to 3.1 mols of a diphenyl isocyanate, and from 0.1 to 2.1 mols of a saturated aliphatic free glycol. The polyester is preferably a reaction product of a saturated, aliphatic glycol having from 2 to 10 carbon atoms and having hydroxyl groups on its terminal atoms, and a dicarboxylic acid of the formula HOOC—R—COOH where R is an alkylene radical containing from 2 to 8 carbon atoms or the anhydride of one of said acids. The polyester has an average molecular weight between about 600 and about 2000. The saturated aliphatic free glycol contains from 2 to 10 carbon atoms and has hydroxyl groups on its terminal carbon atoms. The molar amounts of the polyester and the free glycol combined are essentially equal to the molar amount of diphenyl diisocyanate employed so that the final polyurethane reaction product has essentially no unreacted hydroxyl or isocyanate groups.

The polyetherurethanes are made according to the teachings of United States Patent 2,899,411 by admixing and heating a mixture of one molar equivalent of a hydroxyl poly(methylene oxide) of the formula $HO[(CH_2)_nO]_xH$ wherein $n$ is a number from 3 to 6 and $x$ is an integer greater than 7, from 0.5 to 9.0 molar equivalents of an aliphatic glycol and from about 1.5 to 10 mols of a diphenyl diisocyanate. The hydroxyl poly(methylene oxide) has a molecular weight of about 800 to about 4000. The aliphatic glycol is of the formula $HO(CH_2)_nOH$ and contains 2 to 12 carbon atoms. The molar amounts of the poly(methylene oxide) and aliphatic glycol combined are substantially equivalent to the molar amount of diphenyl diisocyanate so that the polyetherurethane reaction product has substantially no free hydroxyl or isocyanate groups.

Preparation of the low molecular weight, isocyanate-terminated polyurethane prepolymers is a straight forward process. One or more polyesters, polyalkyleneether glycols or polythioethers is combined with a molar excess of diisocyanate and heated to 50° C. to 120° C. to form a polymer having terminal —NCO groups. It is also possible to react diisocyanate with a molar excess of polyester or polyalkyleneether glycol, then cap the resulting product or react it with more diisocyanate to form a prepolymer having terminal —NCO groups. The prepolymer is readily crushed and masticated for mill blending with the linear polyurethane or dissolved in isocyanate-inert solvents such as dimethylformamide and tetrahydrofuran for solvent mixing with the linear polyurethane.

The success of the invention is believed to lie in the ability of the isocyanate groups on the prepolymer to react with liquid water, water vapor or steam to extend and crosslink its own chains and the chains of the matrix polyurethane.

The following example, in which parts are parts by weight, will illustrate the invention.

EXAMPLE I

A linear polyesterurethane polymer is prepared by following the teaching of Patent 2,871,218. First 1000 g. (1.0 mol) of hydroxyl poly(tetramethylene adipate), molecular weight 1000, hydroxyl number 112, acid number 2.5, and 180 g. (2.0 mols) of butanediol-1,4 are mixed in a heated autoclave with stirring for 15 minutes at 10 mm. pressure at 100°–105° C. Next 750 g. (3.0 mols) of diphenylmethane-p,p'-diisocyanate are added and stirred for 2 minutes. The melt is poured into lubricated trays and held in an oven at 140° C. for 3 hours.

An amorphous isocyanate-terminated polyethylene adipate prepolymer, analyzing 6.3% isocyanate, with an equivalent weight of 647 is combined on a rubber mill with the polyesterurethane polymer in the proportions:

| Material: | Parts |
| --- | --- |
| Polyesterurethane | 100 |
| Isocyanate-terminated prepolymer | 30 |

The mixed materials are molded for 10' at 300° F. into sheets 6" x 6" x .075". Compression set pellets are molded at the same conditions. Samples are exposed to heat or moisture, both conditions for reacting isocyanate groups, as follows:

(A) Stand 48 hours in desiccator.
(B) Heat 24 hours in 100° C. oven.
(C) Stand 8 days at 50% relative humidity, 77° F.
(D) Control (polylsterurethane with no added prepolymer).

| | Tensile, p.s.i. | $T_2$,[1] °C. | Comp. Set[2] 22 hrs. at 158° F., percent | Solubility In THF | In DMF |
| --- | --- | --- | --- | --- | --- |
| A | 4,800 | 123 | 91 | Swells | Swells. |
| B | 6,600 | 154 | 41 | Insol. | Insol. |
| C | 7,000 | 140 | 59 | Insol. | Insol. |
| D | 6,400 | 128 | 91 | Sol. | Sol. |

[1] Dynamic extrusion rheometer value which approximates flow temperature under specific pressure.
[2] ASTM Method D395B.
THF—tetrahydrofuran. DMF—dimethylformamide.

Study of the data shows that compression set can be reduced from a value of 91% to 41% and 59% when linear polyesterurethane is combined with a reactive isocyanate-terminated polyurethane prepolymer and exposed to heat and moisture respectively (B, C). If the mixture merely stands at room temperature in dry air, only limited change takes place compared to the properties of the control polymer (A). $T_2$ temperatures are raised from 128° C. for the control to as high as 154° C. for the products of the invention. This change is evidence of increased molecular weight in the polymer chains of the mixture. It is consistent with the reduced solubility and reduced compression set which are observed in the practice of this invention.

I claim:
1. A composition of matter comprising a mixture of (1) 100 parts of essentially linear polyesterurethane, said polyesterurethane comprising the reaction product obtained by heating a mixture of one mol of an essentially linear hydroxyl terminated polyester of a saturated aliphatic glycol having from 2 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 2000 and having an acid number less than 10, and from about 1.1 to 3.1 mols of a diphenyl diisocyanate having an isocyanate group on each phenyl nucleus, in the presence of from about 0.1 to 2.1 mols of a saturated aliphatic free glycol containing from 2 to 10 carbon atoms and having hydroxyl groups on its terminal carbon atoms, the molar amount of said polyester and said free glycol combined being essentially equivalent to the molar amount of said diphenyl diisocyanate and (2) from 1 to 150 parts of an isocyanate-terminated, low molecular weight polyurethane prepolymer, said isocyanate-terminated prepolymer being prepared by reacting from 1.1 to 2.0 mols of a diphenyl diisocyanate with 1.0 mol of a hydroxyl-terminated material selected from the group consisting of linear polyesters, polyethers and polythioethers of molecular weight about 400 to about 5000, said mixture being characterized by substantially lower compression set and substantially greater resistance to polar organic solvents than is exhibited by the essentially linear polyesterurethane (1) alone.

References Cited

UNITED STATES PATENTS

| 2,801,990 | 8/1957 | Seeger | 260—75 |
| 2,814,605 | 11/1957 | Stilmar | 260—858 |
| 2,814,606 | 11/1957 | Stilmar | 260—858 |
| 2,852,483 | 9/1958 | Mason | 260—858 |
| 2,953,539 | 9/1960 | Keplinger | 260—75 |
| 3,012,987 | 12/1961 | Ansul | 260—858 |
| 3,240,842 | 3/1966 | Saunders | 260—858 |
| 3,271,352 | 9/1966 | Weinberg | 260—858 |
| 3,284,539 | 11/1966 | McElroy | 260—858 |

MURRAY TILLMAN, Primary Examiner

P. LIEBERMAN, Assistant Examiner

U.S. Cl. X.R.

260—75, 77.5